Figure 2:
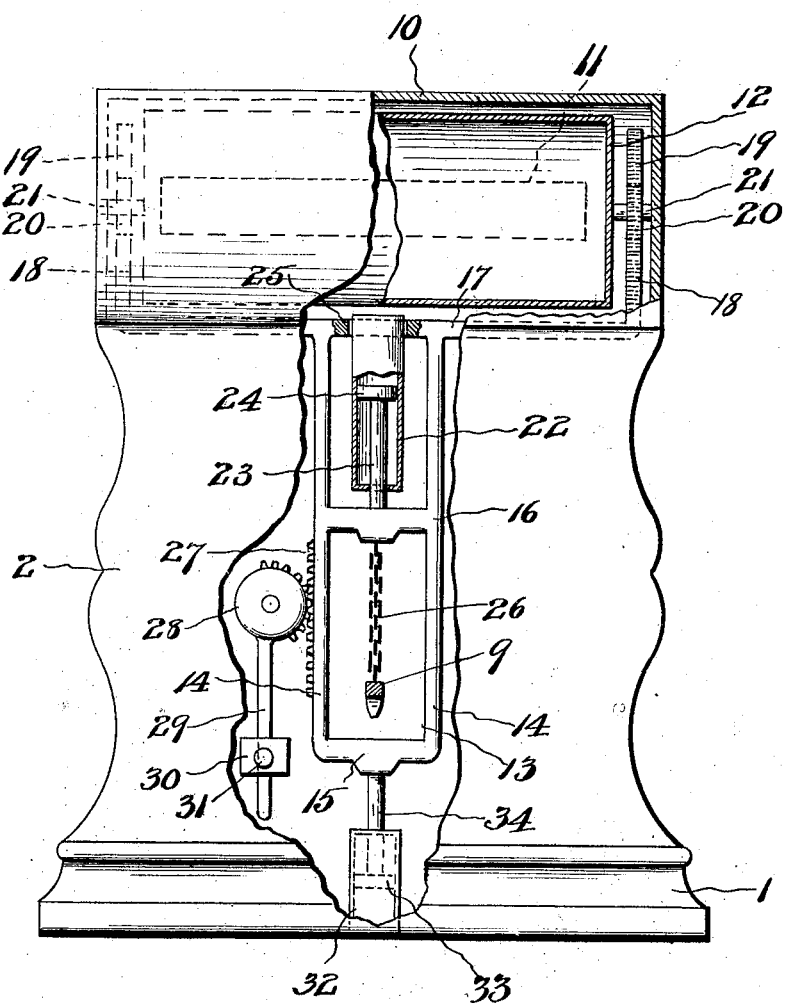

A. G. WORTHINGTON.
SCALE.
APPLICATION FILED OCT. 1, 1908.
935,571.
Patented Sept. 28, 1909.
2 SHEETS—SHEET 1.
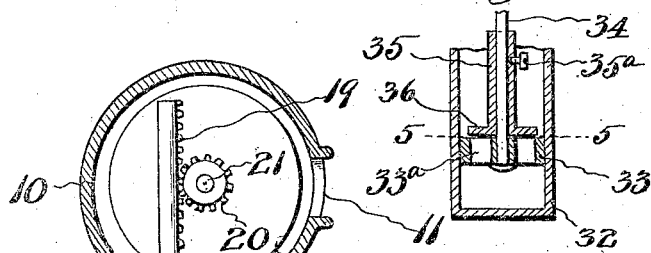
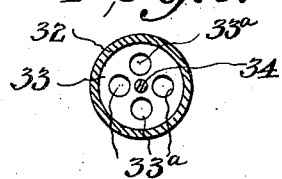
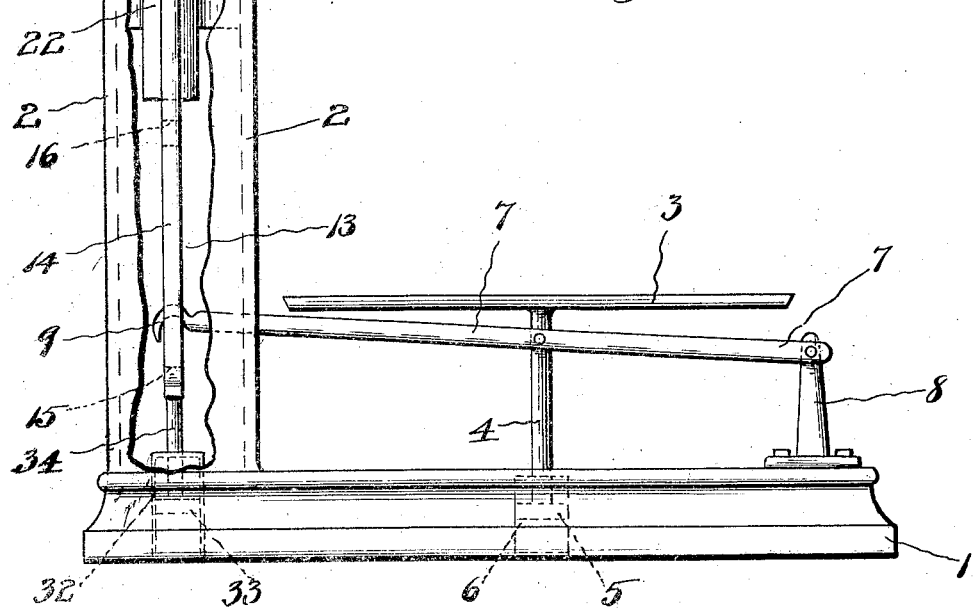
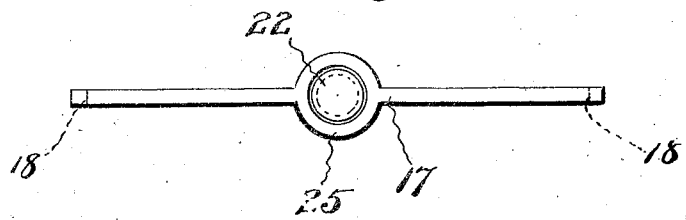
WITNESSES
Jos. H. Blackwood
W. O. Blackwood
INVENTOR
Alva G. Worthington
by James K. Polk
Attorney

A. G. WORTHINGTON.
SCALE.
APPLICATION FILED OCT. 1, 1908.

935,571.

Patented Sept. 28, 1909.
2 SHEETS—SHEET 2.

WITNESSES
Jas. H. Blackwood
W. O. Blackwood

INVENTOR
Alva G. Worthington
by James K. Polk
Attorney

UNITED STATES PATENT OFFICE.

ALVA G. WORTHINGTON, OF DUQUOIN, ILLINOIS.

SCALE.

935,571.  Specification of Letters Patent.  Patented Sept. 28, 1909.

Application filed October 1, 1908. Serial No. 455,608.

*To all whom it may concern:*

Be it known that I, ALVA G. WORTHINGTON, a citizen of the United States, and a resident of Duquoin, in the county of Perry and State of Illinois, have invented certain new and useful Improvements in Scales, of which the following is a specification.

My invention relates to scales and has for its object the provision of improved means for maintaining a balance and also for indicating the weight, being especially adapted for use in what are termed "pull scales".

The construction and operation of my improved scales will be described in detail hereinafter and illustrated in the accompanying drawings, in which—

Figure 1 is a side view, partly broken away, of my improved scales; Fig. 2, an end view; Fig. 3, a horizontal sectional view on the line x x of Fig. 2; Fig. 4, a detail view, on an enlarged scale, of the liquid-brake; and Fig. 5, a cross-section on the line 5 5 of Fig. 4.

In the drawings similar reference characters indicate corresponding parts in all of the views.

1 indicates the base of my improved scales, and 2 an upright casing mounted at one end of the base. The platform 3 is mounted on a supporting bar 4 having a plunger 5 secured to its lower end mounted in a tubular guide-casing 6. Bar 4 is pivotally secured to rod 7 intermediate of its ends, and one end of the rod is pivotally secured to support 8, secured to base 1, while the other end of the rod is provided with a hook 9. The upper end of casing 2 is formed cylindrical, as shown at 10, and is provided with an elongated opening 11, through which may be read the weight indicated on the surface of roller 12, journaled in the ends of cylindrical casing 10.

13 indicates a frame consisting of two vertical bars 14, spaced apart and joined at their lower ends by a cross-bar 15 and a cross-bar 1″ intermediate of their ends, while their upper ends are joined by a horizontal bar 17, extending beyond the bars 14, forming arms that have their ends turned upwardly, as shown at 18, and provided with rack-falls 19.

20 indicates pinions secured to the trunnions 21 of roller 12 that mesh with racks 19.

22 indicates a tubular guide secured to casing 2, and 23 a rod secured to cross-bar 16, having a plunger 24 thereon mounted in said guide 22. The horizontal bar 17 is formed with an eye 25 large enough in diameter to slide on the guide 22, the purpose of said construction being to keep the frame 13 in a vertical position and the racks 19 and pinions 20 in engagement.

26 indicates a chain or other flexible device that engages hook 9, so that the downward movement of the platform 3 imparts a downward pull on the frame 13 and rotates the roller 12 to indicate the weight, or, if desired, the surface of the roller may be arranged to indicate the price of the amount of the commodity weighed. One of the vertical bars 14 has a rack 27 thereon, and 28 indicates a gear-wheel journaled on casing 2 and meshing with said rack.

29 indicates a pendulum rod secured to gear-wheel 28, and 30 a counterbalance weight adjustably secured to pendulum-rod 29 by means of set-screw 31.

32 indicates a cylinder secured to the bottom of casing 2 to contain any suitable liquid, and 33 a piston operating in said cylinder and connected to cross-bar 15 by means of piston-rod 34. Piston 33 is provided with openings 33$^a$ for the passage of the liquid therethrough controlled by a cut-off consisting of a sleeve 35 adjustably secured to piston-rod 34 by means of set screw 35$^a$ and having flanges 36 on its lower end corresponding to the shape of the openings 33$^a$. This structure constitutes a brake to retard the downward movement of frame 13 when weighing a commodity and its upward movement when the weight is removed, the rapidity of movement of the piston being regulated by the position of the cut-off relative to the openings 33$^a$ in the piston 33.

Having thus described my invention, what I claim is—

1. In a weighing apparatus, a roller suitably journaled, pinions operatively secured to said roller, a frame having upright arms formed with gear-racks meshing with said pinions, another gear-rack formed on the frame, a gear-wheel meshing with the last-mentioned rack, a pendulum-rod secured to said gear-wheel, and a weight adjustably secured to said pendulum-rod, substantially as shown and described.

2. In a weighing apparatus, a base, a casing mounted on the base, a tubular guide secured to the base, a rod having a plunger mounted in said guide, a platform mounted on said rod, a support mounted on the base, a bar pivotally secured to the support and rod, a frame mounted in the casing and engaging said bar, said frame having arms provided with racks, a roller suitably journaled and provided with the weight-indicating characters, pins operatively connected to said roller and meshing with the racks on the frame, a tubular guide secured to the casing, a rod secured to the frame and provided with a plunger engaging said guide, a cylinder containing a liquid, a piston in said cylinder, a piston-rod connecting said piston and frame, a rack in the side of said frame, a gear-wheel journaled in said casing and engaging said rack, a pendulum-rod secured to said gear-wheel, and a counterbalance-weight adjustably secured to said rod, substantially as shown and described.

In witness whereof, I have hereunto set my hand in presence of two subscribing witnesses.

ALVA G. WORTHINGTON.

Witnesses:
H. WORTHINGTON,
GUY WOLFE.